US012776677B2

(12) United States Patent
Wu et al.

(10) Patent No.: US 12,776,677 B2
(45) Date of Patent: Oct. 27, 2026

(54) MOTOR COOLING

(71) Applicant: Rivian IP Holdings, LLC, Irvine, CA (US)

(72) Inventors: Fan Wu, Rancho Palos Verdes, CA (US); Khwaja Rahman, Troy, MI (US); Dang Dinh Dang, Garden Grove, CA (US); Larry Thoua Xiong, Lawndale, CA (US); Shreyas Kapatral, Fullerton, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/617,460

(22) Filed: Mar. 26, 2024

(65) Prior Publication Data

US 2025/0309714 A1 Oct. 2, 2025

(51) Int. Cl.

*H02K 1/32* (2006.01)
*H02K 1/276* (2022.01)
*H02K 1/30* (2006.01)
*H02K 9/19* (2006.01)

(52) U.S. Cl.

CPC ............... *H02K 1/32* (2013.01); *H02K 1/276* (2013.01); *H02K 1/30* (2013.01); *H02K 9/19* (2013.01); *H02K 2201/06* (2013.01)

(58) Field of Classification Search

CPC ............ H02K 1/32; H02K 1/276; H02K 1/30; H02K 9/19; H02K 2201/06
USPC ............................................................ 310/54
See application file for complete search history.

(56) References Cited

U.S. PATENT DOCUMENTS

| | | | | |
|---|---|---|---|---|
| 6,002,191 A | 12/1999 | Saban | | |
| 6,727,609 B2 * | 4/2004 | Johnsen | H02K 1/32 | 310/58 |
| 8,159,094 B2 * | 4/2012 | Ruffing | H02K 1/32 | 310/58 |
| 8,362,661 B2 | 1/2013 | DeBlock | | |
| 8,492,941 B2 * | 7/2013 | Endo | H02K 1/32 | 310/59 |
| 8,896,167 B2 * | 11/2014 | McKinzie | H02K 9/00 | 310/60 A |
| 8,970,074 B2 * | 3/2015 | Wagner | H02K 7/003 | 310/59 |
| 8,970,075 B2 * | 3/2015 | Rippel | H02K 1/32 | 310/60 A |
| 9,627,943 B2 * | 4/2017 | Tokunaga | H02K 1/32 | |
| 9,847,682 B2 * | 12/2017 | Takahashi | H02K 1/28 | |
| 11,374,473 B2 | 6/2022 | Maier | | |
| 11,626,776 B2 | 4/2023 | Jackson | | |
| 2004/0080218 A1 * | 4/2004 | Weidman | H02K 1/32 | 310/61 |
| 2007/0013241 A1 | 1/2007 | Schiferl | | |
| 2010/0194220 A1 * | 8/2010 | Tatematsu | H02K 1/32 | 310/61 |
| 2012/0086291 A1 | 4/2012 | DeBlock | | |

(Continued)

*Primary Examiner* — Alex W Mok
(74) *Attorney, Agent, or Firm* — BakerHostetler

(57) ABSTRACT

Aspects of the subject disclosure relate to an electric motor with cooling features. A motor can provide cooling with a flow of fluid through channels that contain the magnets of the rotor. This provides cooling where it is most beneficial to the magnets, which can then be selected without requiring as much resilience to thermal conditions. The flow can be directed in various directions across the length of the rotor.

19 Claims, 7 Drawing Sheets

(56) References Cited

U.S. PATENT DOCUMENTS

| | | | | |
|---|---|---|---|---|
| 2013/0264897 | A1 | 10/2013 | Bradfield | |
| 2014/0111050 | A1 | 4/2014 | Chamberlain | |
| 2015/0280525 | A1* | 10/2015 | Rippel | H02K 9/24 310/54 |
| 2016/0261169 | A1 | 9/2016 | Rawlinson | |
| 2016/0322874 | A1* | 11/2016 | Yoshinori | H02K 1/32 |
| 2018/0013326 | A1 | 1/2018 | Mongeau | |
| 2018/0375395 | A1* | 12/2018 | Yamagishi | H02K 9/197 |
| 2019/0296614 | A1 | 9/2019 | Tang | |
| 2019/0319505 | A1* | 10/2019 | Degner | H02K 1/30 |
| 2020/0144898 | A1 | 5/2020 | Maier | |
| 2021/0028662 | A1 | 1/2021 | Tang | |
| 2021/0135533 | A1* | 5/2021 | Samie | H02K 1/276 |
| 2021/0203202 | A1* | 7/2021 | Yagyu | H02K 1/278 |
| 2021/0288564 | A1 | 9/2021 | Lahrman | |
| 2021/0305876 | A1* | 9/2021 | Vanhee | H02K 9/19 |
| 2021/0347245 | A1 | 11/2021 | Dlala | |
| 2021/0351642 | A1 | 11/2021 | Dlala | |
| 2021/0384801 | A1* | 12/2021 | Oh | H02K 9/06 |
| 2022/0140676 | A1* | 5/2022 | Tanaka | H02K 15/03 310/156.01 |
| 2022/0294295 | A1* | 9/2022 | Yang | H02K 1/32 |
| 2022/0337113 | A1 | 10/2022 | Dang et al. | |
| 2022/0337125 | A1 | 10/2022 | Dang et al. | |
| 2023/0299642 | A1 | 9/2023 | Kunatharaju et al. | |

* cited by examiner

MOTOR COOLING

INTRODUCTION

The present disclosure relates generally to the automotive, manufacturing, and industrial equipment fields. More particularly, the present disclosure relates to systems and methods for achieving motor cooling using flow along magnets. In the context of electric vehicles, providing cooling using flow along magnets can help optimize efficiency of the motor and energy usage of the vehicle and ultimately increase the operating range of vehicle's battery.

SUMMARY

In some embodiments, the present disclosure is directed to a cooling apparatus. A motor can provide cooling with a flow of fluid through channels that contain the magnets of the rotor. This provides cooling where it is most beneficial to the magnets, which can then be selected without requiring as much resilience to thermal conditions. The flow can be directed in various directions across the length of the rotor.

In accordance with one or more aspects of the disclosure, a rotor assembly for a motor can include a rotor shaft comprising a shaft channel and a rotor core. The rotor core can be disposed about the rotor shaft and define first magnet channels and second magnet channels each extending between opposing axial ends of the rotor core, each of the first magnet channels and the second magnet channels containing a magnet. The rotor shaft can define first inlet passages passing through a first portion of a wall at a first end of the rotor shaft to provide fluid communication between the shaft channel of the rotor shaft and the first magnet channels of the rotor core and second inlet passages passing through a second portion of the wall at a second end of the rotor shaft to provide fluid communication between the shaft channel of the rotor shaft and the second magnet channels of the rotor core.

In accordance with one or more aspects of the disclosure, a motor can include a stator and a rotor. The stator can include stator coils configured to generate a rotating magnetic field. The rotor can include a rotor shaft comprising a shaft channel, a rotor core, and magnets. The rotor core can be disposed about the rotor shaft and define magnet channels extending between opposing axial ends of the rotor core. The magnets can be arranged in each of the magnet channels of the rotor core. The magnets can be responsive to the rotating magnetic field. The rotor shaft can define inlet passages passing through a wall of the rotor shaft to provide a flow of a fluid from the shaft channel of the rotor shaft to the magnet channels of the rotor core as the rotor rotates.

In accordance with one or more aspects of the disclosure, a method for cooling a rotor assembly of a motor can include providing the rotor assembly comprising a rotor shaft and a rotor core; providing a fluid to a shaft channel of the rotor shaft; and directing the fluid to flow from the shaft channel and through magnet channels of the rotor core, each of the magnet channels containing a magnet.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present description relates generally to an electric motor that includes a rotor assembly with permanent magnets. One issue that can arise in motor cooling architectures is the concentration of motor losses near the outer surface of the rotor assembly. For example, motor losses give rise to heat generation, which can be extracted through stator and rotor cooling. Excessive heating of the magnets of a motor (e.g., in the rotor assembly) can degrade the magnets over time. In some embodiments, the present disclosure is directed to achieving cooling of the magnets of a rotor assembly, for example with flow of a fluid that is directed by end plates of the rotor assembly. Rather than indirectly cooling magnets of a rotor assembly through the rotor core, the magnets can be provided within channels that receive a flow of fluid for cooling the magnets via direct contact with the flow of the cooling fluid. By managing the heat conditions of the magnets, the magnets can be protected from demagnetization. In some embodiments, such management can allow the selection of magnets that have lower thresholds for resisting thermal conditions.

Accordingly, in some embodiments, the present disclosure is directed to a cooling apparatus. A motor can provide cooling with a flow of fluid through channels that contain the magnets of the rotor assembly. This provides cooling where it is most beneficial to the magnets, which can then be selected without requiring as much resilience to thermal conditions. The flow can be directed in various directions across the length of the rotor.

Figure 1:
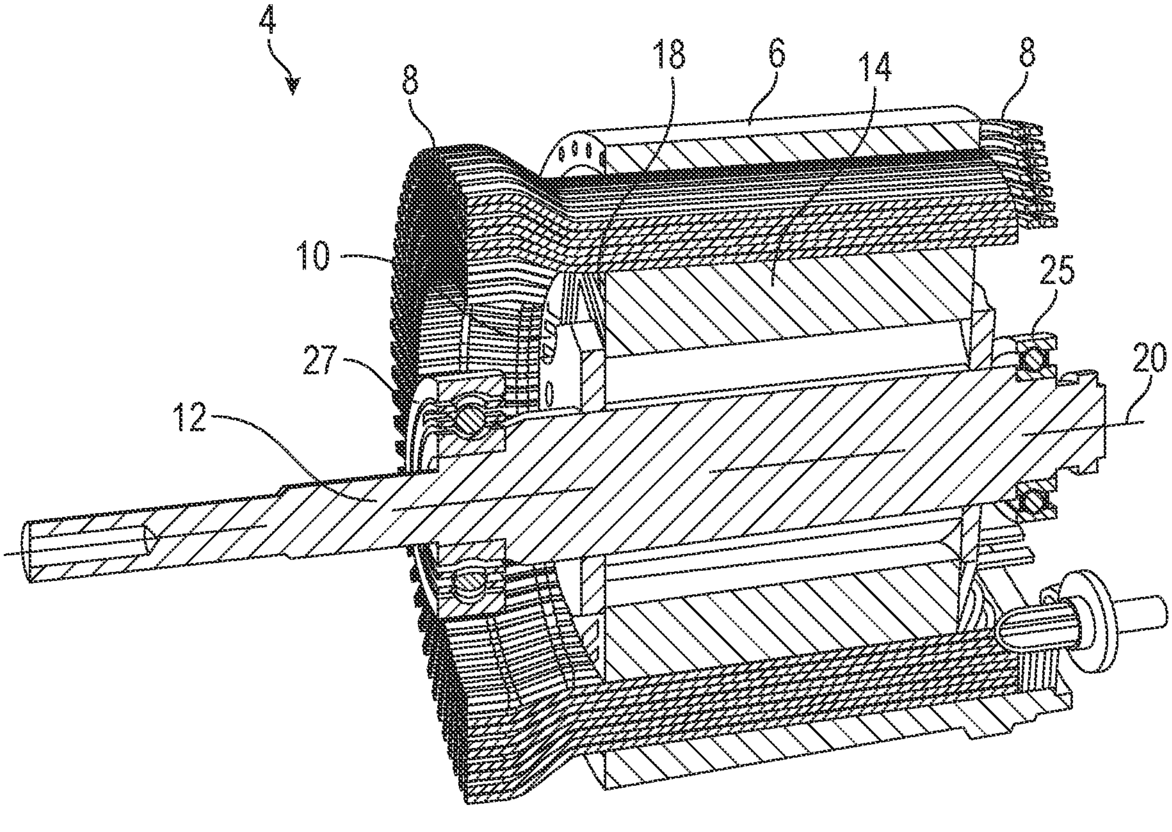
FIG. 1 illustrates a perspective sectional view of an electric motor in accordance with one or more implementations of the subject technology.

Referring to FIG. 1, a motor can include a stator and a rotor for providing rotational output at a shaft. FIG. 1 is a partial perspective view of a motor 4 having a stator 6 and a rotor assembly 10.

In some embodiments, as shown in FIG. 1, a motor 4 can include a generally cylindrical rotor shaft 12 concentrically surrounded by a cylindrical rotor assembly 10. As used herein, "cylindrical" and "annular" refer to structures having a generally circular internal cross-sectional shape, and a likely a roughly circular external cross-sectional shape, although this external cross-sectional shape may vary to some degree, having flat or irregular regions. The rotor shaft 12 and rotor assembly 10 are configured to rotate concentrically about a common central axis 20 in unison, potentially at high revolutions-per-minute (RPM). The rotor assembly 10 can be manufactured from electric steel. The rotor shaft 12 can be manufactured from steel and/or other possible metal or metal alloy.

The motor 4 can include a stator 6 comprising stator coils 8 configured to generate a rotating magnetic field. The rotating magnetic field can be generated by running multiple-phase currents through the stator coils 8. The stator coils 8 can form segments of its windings distributed about the rotor assembly 10. For example, as shown in FIG. 1, the stator coils 8 can form segments that each extend in a direction that is generally parallel to the central axis 20 of the rotor assembly 10. The rotating magnetic field generated by the stator 6 can rotate about the central axis 20 of the rotor assembly 10. Neither the stator 6 nor the stator coils 8 need to move to generate the rotating magnetic field. For example, the coils can be operated with an alternating current with different segments thereof having a different direction and/or magnitude of current at any given moment. As the current direction and/or magnitude changes for each segment of the stator coils 8 over time, the magnetic field generated in the vicinity thereof can correspondingly change. Accordingly, the resulting magnetic field can be characterized as a magnetic field (e.g., with alternating magnetic field directions extending circumferentially about the central axis 20) that rotates about the central axis 20. The rotating magnetic field can further extend through the rotor assembly 10, which can include permanent magnets 18. The rotating magnetic field generated by the stator 6 can magnetically interact with such components of the rotor assembly 10 to cause the rotor assembly 10 to rotate about the central axis 20.

End windings of the stator coils 8 (e.g., crown end windings and/or weld end windings) of the stator 6 can be of a conductive material such as copper or another suitable metal or material. The end windings of the stator coils 8 may protrude axially beyond the rotor assembly 10 and/or concentrically surround the rotor assembly 10. The end windings of the stator coils 8 are connected to each other in parallel and/or in series to form a set of winding with multiple-phase terminals, which are operably connected to a driver, such as an inverter consisting of electrical switches.

The rotor shaft 12 and/or the rotor assembly 10 can be rotated with a first bearing assembly 25 disposed at the first end of the rotor shaft 12 and a second bearing assembly 27 disposed at the second end of the rotor shaft 12. As such, the rotor assembly 10 and/or the rotor shaft 12 can be rotated about the central axis 20 as it responds to the rotating magnetic field generated by the stator 6. The rotor shaft 12 can accordingly provide torque output.

Figure 2:
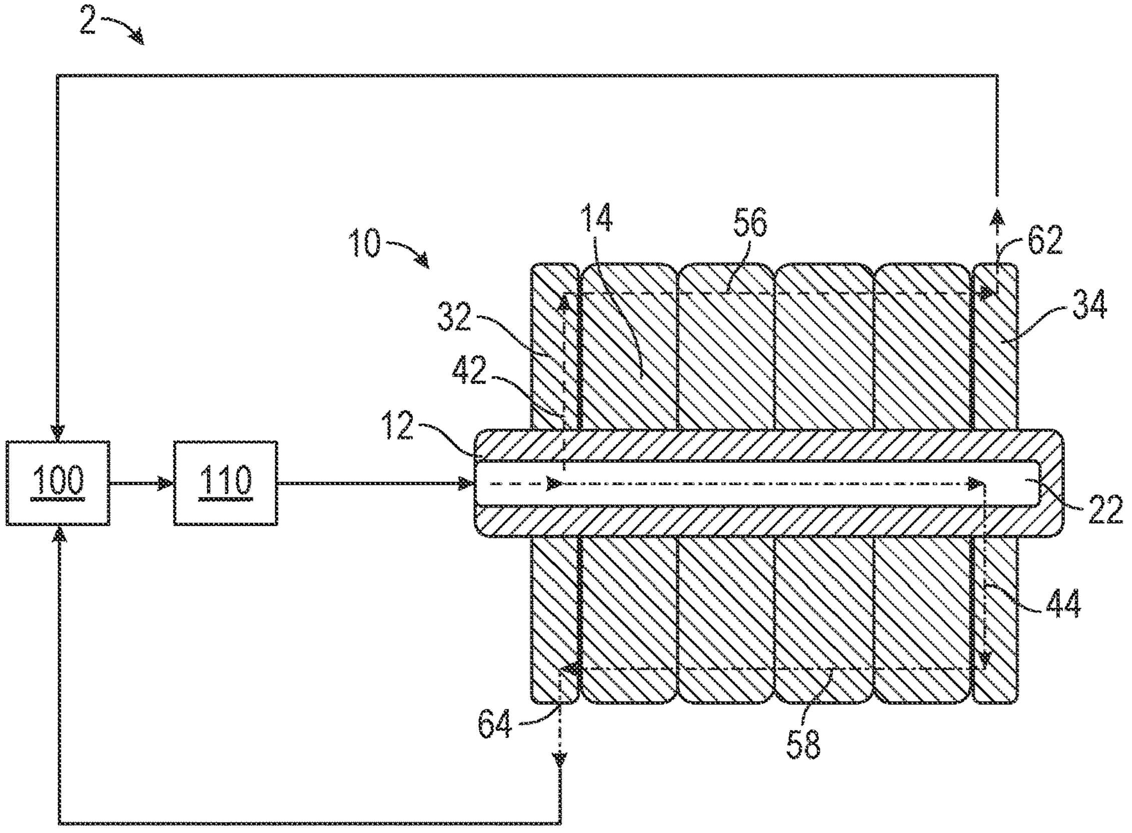
FIG. 2 illustrates a side sectional view of a system for an electric motor in accordance with one or more implementations of the subject technology.

FIG. 2 shows a block diagram of a system 2 including a fluid reservoir 100, a pump 110, and a rotor assembly 10 of an electric motor. In some embodiments, as shown in FIG. 2, the rotor assembly 10 can include a rotor core 14 and one or more end plates (e.g., a first end plate 32 and a second end plate 34) at each of opposing axial ends of the rotor core 14. In some embodiments, the rotor assembly 10 is an interior permanent magnet (IPM) rotor, which may inherently produce relatively higher torque density and power density due to combined magnet torque and reluctant torque, for example with respect to an induction motor. In some embodiments, even though IPM rotor losses, core losses, and magnet losses may be relatively lower than traditional induction motors, rotor loss does still occur in permanent magnet motors. For example, rotor losses may translate to heat, which can have an impact on both permanent magnet remanence (Br) and coercivity (Hcj), which may result in torque reduction and lower demagnetization protection. Accordingly, rotor cooling can enhance operation of a motor (e.g., an IPM motor) for performance enhancement and achieving an improved demagnetization performance in the motor.

In order to achieve cooling of the rotor assembly 10, a fluid (e.g., a liquid lubricant such as oil) is provided through the rotor assembly 10 via first magnet channels 56 and second magnet channels 58. The fluid is provided from a fluid reservoir 100 and directed by a pump 110 to the rotor shaft 12, such as through a shaft channel 22. The fluid reservoir can include and/or be fluidly coupled to one or more other conditioning components, such as a heat exchanger and/or a radiator.

The rotor shaft 12 can define the shaft channel 22, for example along an axis of rotation of the rotor assembly 10. The rotor core 14 can be disposed about the rotor shaft 12. The rotor core 14 can include one or more layers and define one or more first magnet channels 56 and one or more second magnet channels 58, each extending between opposing axial ends of the rotor core 14. The rotor assembly 10 can further include one or more first end plates 32 and one or more second end plates 34 at each of opposing axial ends of the rotor core 14.

The rotor shaft 12 can define one or more first inlet passages 42 passing through a first portion of a wall at a first end of the rotor shaft 12. It will be understood that the first inlet passages 42 can be further defined by one or more channels of the first end plate 32, for example facing the rotor core 14 as described further herein. In some embodiments, the first inlet passages 42 can be defined by and/or between the first end plate 32 and the rotor core 14. In some embodiments, the first inlet passages 42 can be defined entirely within the first end plate 32. The one or more first inlet passages 42 can provide fluid communication between the shaft channel 22 of the rotor shaft 12 and the first magnet channels 56 of the rotor core 14. First outlet passages 62 can be defined by one or more channels of the second end plate 34, for example facing the rotor core 14 as described further herein.

The rotor shaft 12 can further define one or more second inlet passages 44 passing through a second portion of the wall at a second end of the rotor shaft 12. It will be understood that the second inlet passages 44 can be further defined by one or more channels of the second end plate 34, for example facing the rotor core 14 as described further herein. In some embodiments, the second inlet passages 44 can be defined by and/or between the second end plate 34 and the rotor core 14. In some embodiments, the second inlet passages 44 can be defined entirely within the second end plate 34. The one or more second inlet passages 44 can provide fluid communication between the shaft channel 22 of the rotor shaft 12 and the second magnet channels 58 of the rotor core 14. Second outlet passages 64 can be defined by one or more channels of the first end plate 32, for example facing the rotor core 14 as described further herein.

As the relatively cool oil enters the shaft channel 22 (e.g., of the hollow rotor shaft 12, as illustrated), the fluid then flows to the first inlet passages 42 and the second inlet passages 44, which are open to the shaft channel 22 proximal to respective, opposite axial ends of the rotor core 14. Each of the first inlet passages 42 and the second inlet passages 44 may include a respective set of channels arranged azimuthally about an axis of rotation (e.g., in an equally spaced pattern or other suitable arrangement). The fluid flows approximately axially in the first magnet channels 56 in a first direction, and the fluid flows approximately axially in the second magnet channels 58 in a second direction opposite the first direction, thus forming an axially cross flow arrangement. As the fluid flows through the first magnet channels 56 and the second magnet channels 58, the fluid absorbs heat generated from losses in the rotor assembly 10 through contact between the fluid, the magnets therein (not shown) and the walls of the rotor core 14 (e.g., which may include electrical steel). Where the first magnet channels 56 and the second magnet channels 58 form a cross flow arrangement, the rotor assembly 10 may exhibit a relatively more uniform temperature gradient (e.g., axial temperature gradients are lessened). The fluid, after absorbing the heat from losses in rotor assembly 10, flows out of the first outlet passages 62 and the second outlet passages 64, for example, along the first and second end plates 32 and 34 facing the corresponding sides of the rotor core 14. The fluid travels radially outward along the first outlet passages 62 and the second outlet passages 64 (e.g., due to centrifugal forces). The flow can optionally include cooling and/or other thermal management of the stator (e.g., at the end windings). The fluid may flow, drip, or otherwise return to reservoir 100 for recirculation in the fluid system (e.g., by operation of the pump 110 to repeat heat transfer in a continuous flow).

In an illustrative example, the electric motor of the system 2 may correspond to an electric motor having improved performance, due at least in part to effective heat extraction using fewer parts. To illustrate, a rotor such as rotor assembly 10 may exhibit a uniform thermal gradient while the fluid extracts heat from the core of rotor assembly 10. In some embodiments, the rotor core 14 can include a plurality of laminations and the first and second end plates 32 and 34, which can have a common design, thus resulting in relatively low-cost part and fewer parts or part types.

Figure 3:
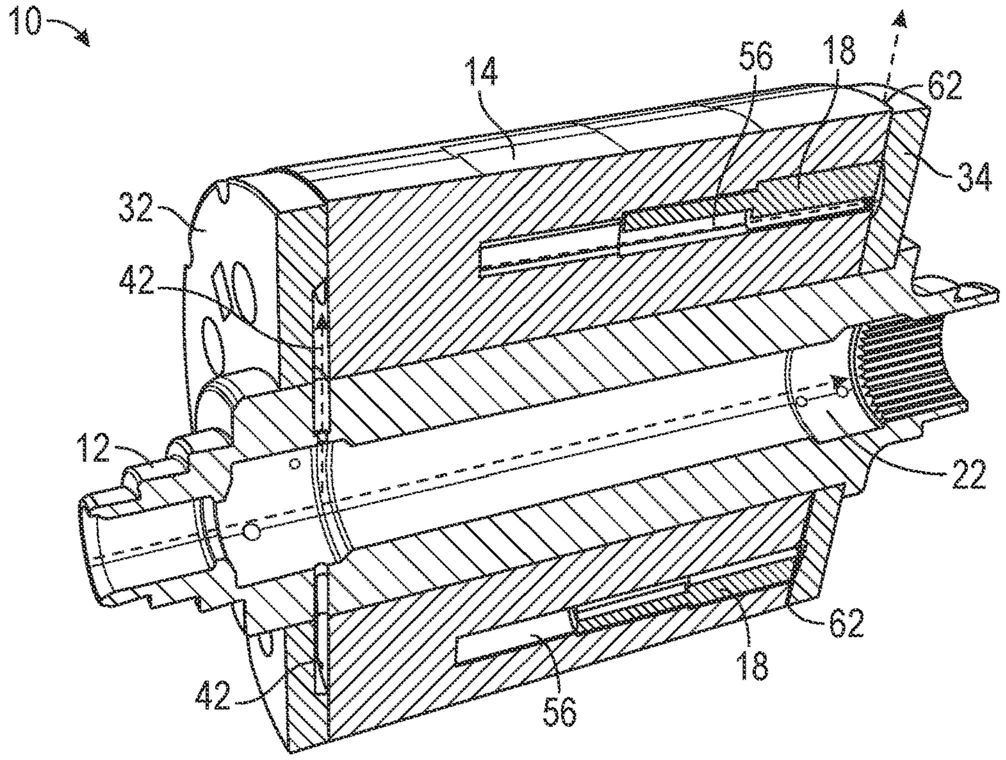
FIG. 3 illustrates a perspective sectional view of a rotor assembly in accordance with one or more implementations of the subject technology.
Figure 4:
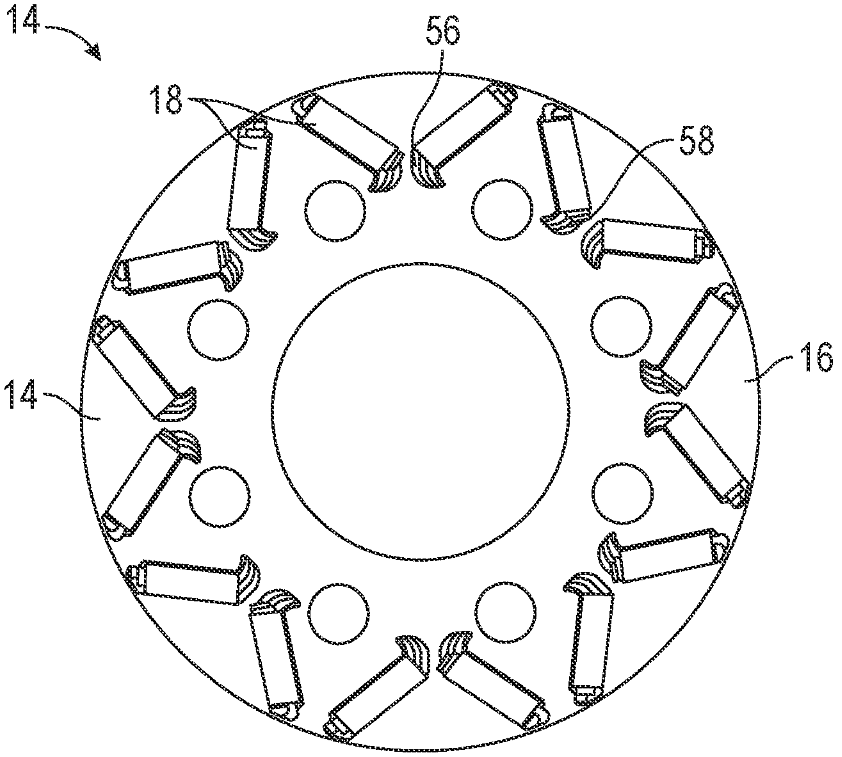
FIG. 4 illustrates a front view of a rotor core in accordance with one or more implementations of the subject technology.

Referring now to FIGS. 3 and 4, the magnet channels can be arranged to provide flow in one or more of a variety of directions. As shown in FIG. 3, the rotor core 14 can be disposed about the rotor shaft 12.

In some embodiments, the rotor assembly 10 can define the one or more first inlet passages 42 passing through a first portion of a wall of the rotor shaft 12 and/or between the rotor core 14 and the first end plate 32. The first inlet passages 42 of the rotor core 14 are shown on radially opposite sides of the rotor shaft 12. It will be understood that any one or more of the first inlet passages 42 can be positioned at any circumferential locations on a first side of the rotor shaft 12. The second inlet passages (not shown) can be at different circumferential positions along the rotor core 14.

In some embodiments, the rotor assembly 10 can define the one or more first inlet passages 42 passing through a first portion of a wall of the rotor shaft 12 and/or between the rotor core 14 and the first end plate 32. The first magnet channels 56 of the rotor core 14 are shown on radially opposite sides of the rotor shaft 12. It will be understood that any one or more of the first magnet channels 56 can be positioned at any circumferential locations within the rotor core 14. The second magnet channels (not shown) can be at different circumferential positions within the rotor core 14.

In some embodiments, the rotor assembly 10 can define the one or more first outlet passages 62 passing between the rotor core 14 and the second end plate 34. In some embodiments, the first outlet passages 62 and/or the second outlet passages 64 can be defined by and/or between the rotor core 14 and the first end plate 32 or between the rotor core 14 and the second end plate 34. The first outlet passages 62 are shown on radially opposite sides of the rotor shaft 12 and axially opposite sides of the rotor core 14. It will be understood that any one or more of the first outlet passages 62 can be positioned at any circumferential locations with respect to the rotor shaft 12. The second outlet passages (not shown) can be at different circumferential positions along the rotor core 14.

FIG. 4 shows an end view of illustrative rotor core 14 having first and second magnet channels 56 and 58, in accordance with some embodiments of the present disclosure. First and second magnet channels 56 and 58 can be arranged azimuthally around a rotor shaft (not shown) that is fitted within the rotor core 14. For example, as illustrated in FIG. 4, rotor core 14 includes 16 channels (e.g., eight first magnet channels 56 and eight second magnet channels 58), wherein each adjacent set of first and second magnet channels 56 and 58 form a pair, with each corresponding pair spaced 45 degrees azimuthally. Each of the first and second magnet channels 56 and 58 can include one or more magnets 18 positioned therein. For example, the magnets 18 can occupy a portion of the corresponding one of the first and second magnet channels 56 and 58. The magnets 18 can be fixed in position based, for example, on the geometry of the corresponding one of the first and second magnet channels 56 and 58 and/or a magnetic coupling to a body 16 of the rotor core 14. The magnets 18 can occupy a space such that portions of the first and second magnet channels 56 and 58 remain open to facilitate a flow of fluid there through. As such, the first and second magnet channels 56 and 58 can allow fluid to flow directly against the magnets 18 for cooling thereof. The spaces for flow can be provided on any side of each given magnet 18, including at long ends thereof.

Figure 5:
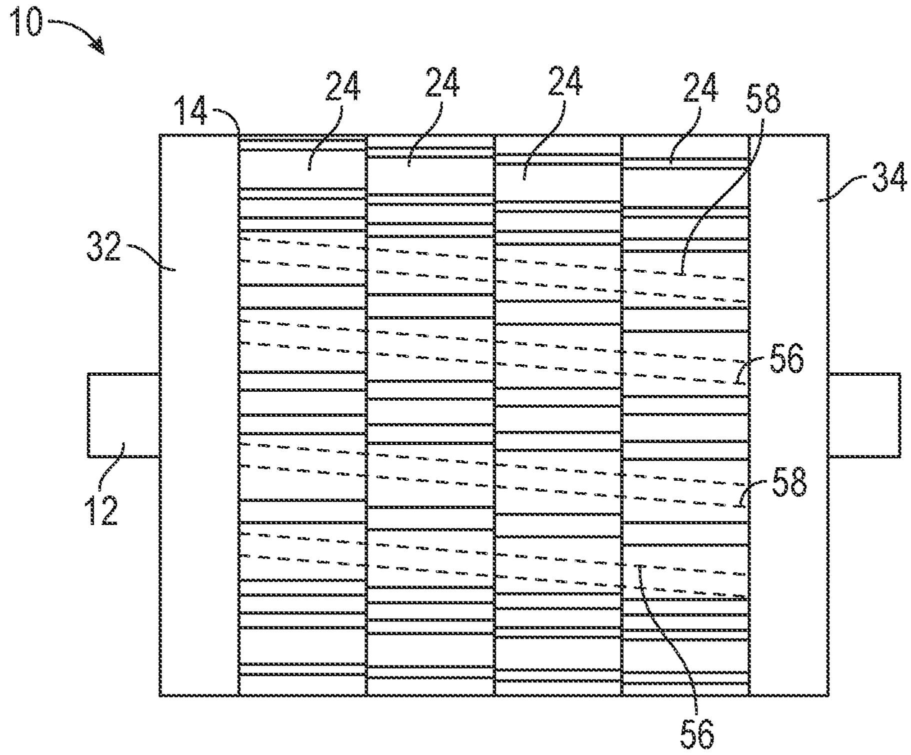
FIG. 5 illustrates a side view of a rotor assembly in accordance with one or more implementations of the subject technology.
Figure 6:
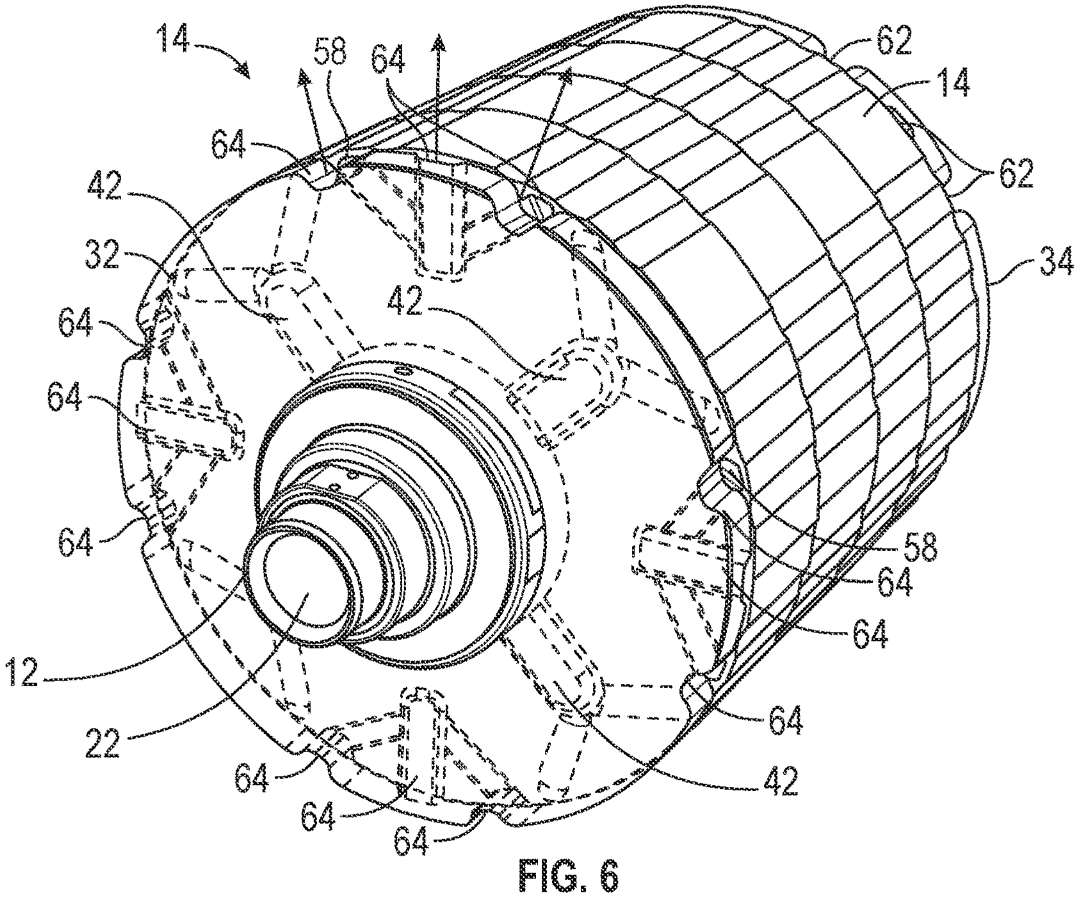
FIG. 6 illustrates a perspective view of a rotor assembly in accordance with one or more implementations of the subject technology.

Referring now to FIG. 5, the magnet channels of a rotor can extend in one or more of a variety of directions. For example, as shown in FIG. 5, the body of rotor assembly 10 may include a plurality of laminations (e.g., steel) formed as layers 24 having first and second magnet channels 56 and 58. While four layers 24 are illustrated, it will be understood that any number of layers 24 can be provided. Each of the layers 24 can be circumferentially offset with respect to an adjacent one of the other layers 24. Such an offset can provide flow in a non-axial path through each of the first and second magnet channels 56 and 58. For example, the first and second magnet channels 56 and 58 can extend in a linear or non-linear path that winds partially about the central axis of the rotor assembly 10, rather than parallel to the central axis. This can result in an inlet passage on one side (e.g., at the first end plate 32) of each of the first and second magnet channels 56 and 58 to be circumferentially offset with respect to the outlet passage on the opposite side (e.g., at the second end plate 34) of the corresponding one of the first and second magnet channels 56 and 58. As such, the first and second magnet channels 56 and 58 can generally form a helical path. Such a helical path can facilitate travel of the fluid there through as the rotor assembly 10 rotates. It will be understood that the first and second magnet channels 56 and 58 can extend in other ways, such as parallel to the central axis of the rotor assembly 10 and/or to each other.

Referring now to FIGS. 6-10, a rotor assembly can include end plates to facilitate the flow of the fluid. The rotor assembly 10 can include the rotor shaft 12, the first and second end plates 32 and 34, and the rotor core 14. The rotor shaft 12 includes the shaft channel 22, which opens to first inlet passages 42 formed at least in part by the first end plate 32. The second end plate 34 can form, at least in part, second inlet passages 44 (not shown). The first and second end plates 32 and 34 can be identical to each other, but clocked azimuthally (e.g., approximately 45 degrees) relative to each other such that the first inlet passages 42 align azimuthally with corresponding first outlet passages 62, and second outlet passages 64 align azimuthally with corresponding inlet passages 44 (not shown). It will be understood that the circumferential arrangement of the first and second end plates 32 and 34 can accommodate any helical winding of the first and second magnet channels 56 and 58, such as that illustrated in FIG. 5.

A fluid, such as oil, enters the first inlet passages 42 and fills the first end plate 32 (e.g., the cavities indicated by first inlet passages 42 of the first end plate 32). Similarly, the fluid enters second inlet passages (not shown) and fills the second end plate 34. After entering first inlet passages 42 and second inlet passages, the fluid travels axially through the rotor core 14 (e.g., rotor core 14 may be formed by electrical steel). For example, the rotor core 14 includes the first and second magnet channels corresponding to first and second outlet passages 62 and 64. As the fluid flows through the first and second magnet channels, heat (e.g., caused by rotor loss) is absorbed by the fluid through contact between the fluid and rotor core 14 and/or the magnets therein.

In some embodiments, the first inlet passages 42 (e.g., cavities) of the first end plate 32 line up with the first magnet channels (not shown) in the rotor core 14 (e.g., the rotor laminate stack), and similarly, the second inlet passages 44 (not shown) of the second end plate 34 line up with the second magnet channels 58 in the rotor core 14 (e.g., the rotor laminate stack). This arrangement allows fluid cross flow for rotor heat dissipation with uniform temperature gradient in the rotor assembly 10. After absorbing the heat from rotor loss, the fluid exiting out from first and second end plates 32 and 34 via the first and second outlet passages 62 and 64, and then travels radially outward, cooling the stator end-windings on each axial end (e.g., the lead side and the weld side for a hairpin type motor). The fluid extracts heat from end windings symmetrically resulting in balance of end windings on both axial ends of the stator. In a further illustrative example, use of common first and second end plates 32 and 34 allows low-cost part and fewer parts. Further, symmetrical flows of oil to both end windings result in balanced cooling at the ends of the stator.

In some embodiments, each of the first and/or second inlet passages 42 and 44 can extend and be fluidly connected to one or more of the first and/or second magnet channels 56 and 58. As such, the fluid can be directed to multiple ones of the first and second magnet channels 56 and 58 from any given one or more of the first and second inlet passages 42 and 44.

In some embodiments, each of the first and/or second outlet passages 62 and 64 can extend and be fluidly connected to one or more of the first and/or second magnet channels 56 and 58. As such, the fluid can be directed from multiple ones of the first and second magnet channels 56 and 58 to any given one or more of the first and second outlet passages 62 and 64.

Figure 7:
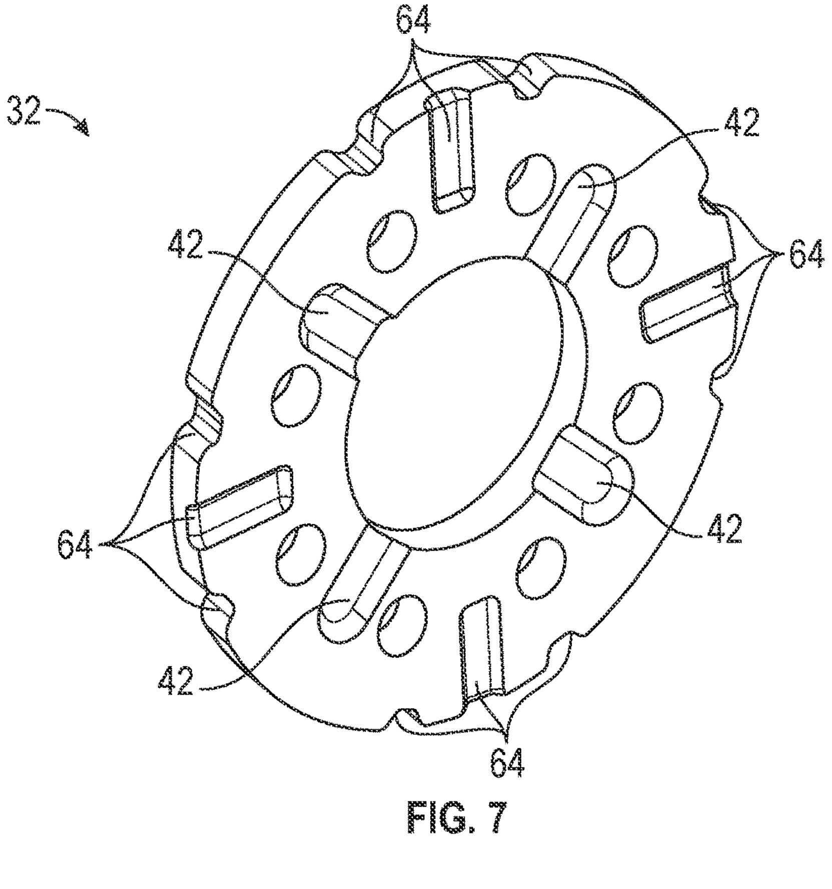
FIG. 7 illustrates a perspective view of an end plate in accordance with one or more implementations of the subject technology.

FIG. 7 shows a perspective view of an illustrative first end plate 32 having first inlet passages 42 and second outlet passages 64, in accordance with some embodiments of the present disclosure. To illustrate, the first end plate 32 may be, but need not be, the same as or similar to first and second end plates 32 and 34 of FIGS. 2-3 and 5-6. As shown in FIG. 7, the first end plate 32 can include four first inlet passages 42 indicated as cavities or recesses. For example, a fluid, such as oil, is directed into the first inlet passages 42 from a shaft channel of a rotor shaft, and then flows from the first inlet passages 42 into longitudinally (e.g., axially or helically) directed magnet channels and out of outlet passages of another end plate (e.g., identical to the first end plate 32 but clocked 45 degrees azimuthally). In some embodiments, the first inlet passages 42 can branch into multiple paths (see FIG. 7), which can extend to each of multiple magnet channels and/or across multiple potions of such magnet channels. The first end plate 32 can also include second outlet passages 64, through which the fluid exits after flowing from a recess of the other end plate through magnet channels of the rotor (e.g., as illustrated in FIGS. 2-5). The second outlet passages 64 can include enclosed channels and/or indentations to expose a corresponding magnet channel. In an illustrative example, a rotor may include two end plates (e.g., a front plate and a rear plate), each identical to the first end plate 32, and clocked relative to each other, to form the cross-flow pattern.

Figure 8:
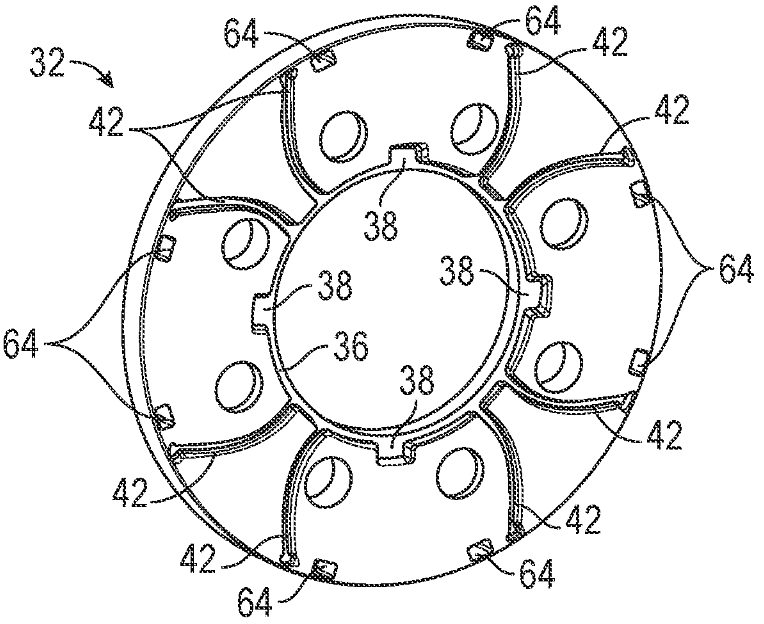
FIG. 8 illustrates a perspective view of an end plate in accordance with one or more implementations of the subject technology.

FIG. 8 shows a perspective view of another illustrative first end plate 32 having first inlet passages 42 and second outlet passages 64, in accordance with some embodiments of the present disclosure. To illustrate, the first end plate 32 may be, but need not be, the same as or similar to first and second end plates 32 and 34 of FIGS. 2-3 and 5-6. As shown in FIG. 8, the first end plate 32 can include an annulus 36 for collecting fluid. The annulus 36 can be continuous about a central region (e.g., for receiving the rotor shaft) and can fluidly connect to each of the first inlet passages 42. The first end plate 32 can include one or more recesses 38 for collecting additional fluid. The recesses 38 can be discrete and separated from each other while being fluidly connected to the annulus 36. The collection of fluid in the annulus 36 and/or the recesses 38 can help direct fluid into the first inlet passages 42, particularly as the rotor assembly rotates about an axis and the centrifugal forces urge the fluid radially outwardly. The first end plate 32 can further include eight first inlet passages 42 indicated as channels. For example, a fluid, such as oil, is directed into the first inlet passages 42 from a shaft channel of a rotor shaft, and then flows from the first inlet passages 42 into longitudinally (e.g., axially or helically) directed magnet channels and out of outlet passages of another end plate (e.g., identical to the first end plate 32 but clocked 45 degrees azimuthally). The first inlet passages 42 can have a curved shape that helps distribute the fluid while the rotor assembly rotates. For example, the first inlet passages 42 can extend from the annulus 36 in a radially outwardly direction (e.g., orthogonal to the rotor axis of rotation) to facilitate motion of the fluid from the annulus 36. The curved paths can further extend the flow to and/or across one or more magnet channels and/or portions thereof. In some embodiments, the first inlet passages 42 can branch into multiple paths (see FIG. 7), which can extend to each of multiple magnet channels and/or across multiple potions of such magnet channels. The first end plate 32 can also include second outlet passages 64, through which the fluid exits after flowing from a recess of the other end plate through magnet channels of the rotor (e.g., as illustrated in FIGS. 2-5). The second outlet passages 64 can include enclosed channels and/or indentations to expose a corresponding magnet channel. In an illustrative example, a rotor may include two end plates (e.g., a front plate and a rear plate), each identical to the first end plate 32, and clocked relative to each other, to form the cross-flow pattern.

FIG. 8 shows a front view of a portion of an illustrative first end plate 32 having second outlet passages 64, each connecting to second magnet channels 58, in accordance with some embodiments of the present disclosure. To illustrate, the first end plate 32 may be, but need not be, the same as or similar to first and second end plates 32 and 34 of FIGS. 2-3 and 5-8. As shown in FIG. 8, the first end plate 32 can include second outlet passages 64, through which the fluid exits after flowing from a recess of the other end plate through second magnet channels 58 of the rotor (e.g., as illustrated in FIGS. 2-5) and/or past the magnets 18. The second outlet passages 64 can include a portion that matches a contour (e.g., edge or wall) of the second magnet channels 58. Accordingly, the flow from the second magnet channels 58 can be directed smoothly to the second outlet passages 64.

Figure 9:
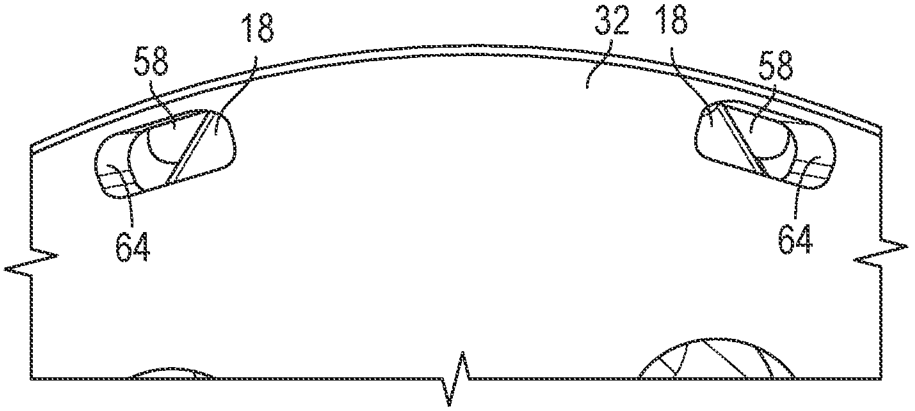
FIG. 9 illustrates a front view of a portion of a rotor assembly having an end plate in accordance with one or more implementations of the subject technology.
Figure 10:
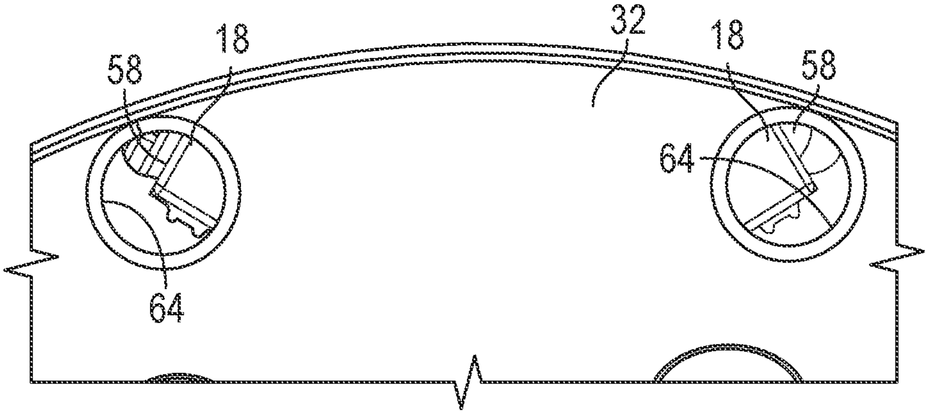
FIG. 10 illustrates a front view of a portion of a rotor assembly having an end plate in accordance with one or more implementations of the subject technology.

FIG. 9 shows a front view of a portion of another illustrative first end plate 32 having second outlet passages 64, each connecting to second magnet channels 58, in accordance with some embodiments of the present disclosure. To illustrate, the first end plate 32 may be, but need not be, the same as or similar to first and second end plates 32 and 34 of FIGS. 2-3 and 5-8. As shown in FIG. 9, the first end plate 32 can include second outlet passages 64, through which the fluid exits after flowing from a recess of the other end plate through second magnet channels 58 of the rotor (e.g., as illustrated in FIGS. 2-5) and/or past the magnets 18. The second outlet passages 64 can include a shape that is different and/or larger than the shape of the second magnet channels 58. In some embodiments, the second outlet passages 64 can include a taper, chamfer, bevel, fillet, and/or other shape to form a transition. Accordingly, the flow from the second magnet channels 58 can be directly freely through the second outlet passages 64.

Figure 11:
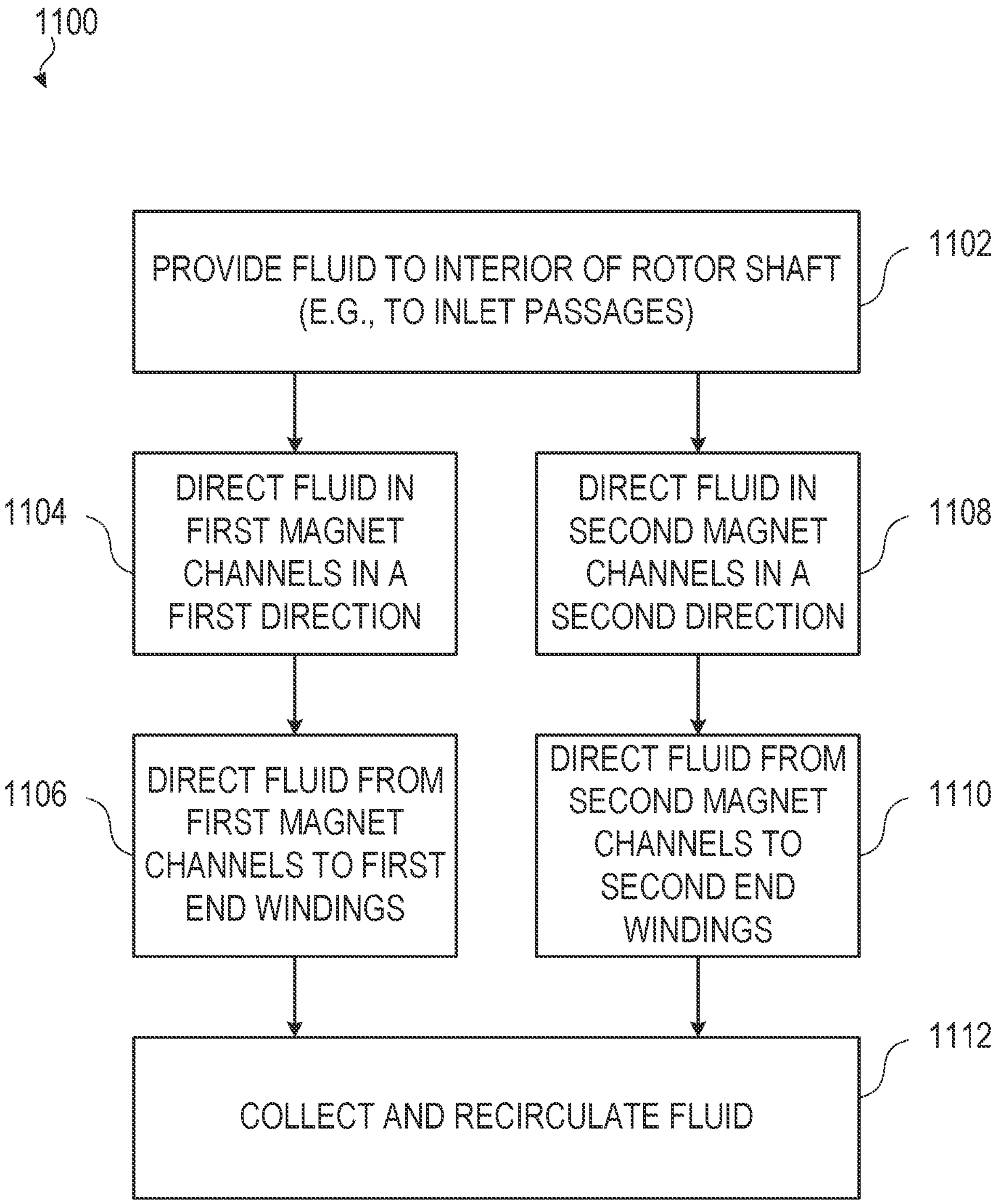
FIG. 11 illustrates a flow diagram of an example process for directing fluid in cross flow in a motor in accordance with one or more implementations of the subject technology.

FIG. 11 illustrates a flow diagram of an example process 1100 for directing fluid in cross flow in a motor in accordance with one or more implementations of the subject technology. For explanatory purposes, the process 1100 is primarily described herein with reference to components of the systems, motor, rotors, and/or assemblies of FIGS. 1-10. However, the process 1100 is not limited to the systems, motor, rotors, and/or assemblies of FIGS. 1-10, and one or more blocks (or operations) of the process 1100 may be performed by one or more other components of other suitable apparatuses, devices, or systems. Further for explanatory purposes, some of the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

Block 1102 includes providing fluid to an interior of a rotor shaft. Block 1102 may include pumping the fluid to an increased pressure to cause the fluid to flow into the interior of the rotor shaft (e.g., a hollow interior region such as shaft channel 22 of FIGS. 1 and 2). In some embodiments, block 1102 may include filtering the fluid, regulating a pressure of the fluid, controlling one or more flow paths of the fluid, controlling a flow rate of the fluid, controlling a temperature of the fluid (e.g., using a radiator or other heat exchanger), or a combination thereof. In an illustrative example, block 1102 may include providing pressurized oil to the interior of the rotor shaft based on flow of the oil.

Block 1104 includes directing fluid in a first path from a first inlet passage to first magnet channels in a first direction. In some embodiments, the fluid in the interior of the rotor shaft provided at block 1102 is caused to flow in the first path based on a pressure field in the first path (e.g., the fluid flows in a path of decreasing pressure). For example, the first path may be open to the interior of the rotor shaft such that the fluid can flow from the interior of the rotor shaft through the first path. The first path may include, for example, a first inlet passage interfaced to (e.g., in fluid communication with, or otherwise open to) the interior of the rotor shaft, one or more first magnet channels, and a first outlet passage through which the fluid exits.

Block 1106 includes directing fluid from the first magnet channels to first end windings. In some embodiments, after the fluid flows through the magnet first channels, the fluid flows radially outward to spray or otherwise impinge on first end windings (e.g., of a stator corresponding to the rotor). The fluid may flow under the effects of centrifugal acceleration, pressure forces, gravity, or a combination thereof to the first end windings. It will be understood that block 1106 can optionally be omitted such that flow is not required to be directed to first end windings.

Block 1108 includes directing fluid in a second path from a second inlet passage to second magnet channels in a second direction. In some embodiments, the fluid in the interior of the rotor shaft provided at block 1102 is caused to flow in the second path based on a pressure field in the second path (e.g., the fluid flows in a path of decreasing pressure). For example, the second path may be open to the interior of the rotor shaft such that the fluid can flow from the interior of the rotor shaft through the second path. The second path may include, for example, a second inlet passage interfaced to (e.g., in fluid communication with, or otherwise open to) the interior of the rotor shaft, one or more second magnet channels, and a second outlet passage through which the fluid exits.

Block 1110 includes directing fluid from the second magnet channels to second end windings. In some embodiments, after the fluid flows through the second magnet channels, the fluid flows radially outward to spray or otherwise impinge on second end windings (e.g., of a stator corresponding to the rotor). The fluid may flow under the effects of centrifugal acceleration, pressure forces, gravity, or a combination thereof to the second end windings. It will be understood that block 1110 can optionally be omitted such that flow is not required to be directed to second end windings.

It will be understood that blocks 1108 and/or 1110 can be omitted or altered, for example where flow is in a single direction (e.g., axial direction) within the magnet channels. It will be further understood that yet other paths with corresponding directions can be provided along with one or more of the paths described herein with respect to FIG. 11.

Block 1112 includes collecting and recirculating the fluid. For example, after the fluid flows through or otherwise past the first and second end windings, the fluid is collected and recirculated. Block 1112 may include collecting the fluid in a basin or a region of an oil-pan or sump, suctioning (e.g., via fluid pressure) or gravity draining the fluid to a filter, pump, radiator, plenum, any other suitable component, or any combination thereof. In some embodiments, for example, fluid (e.g., oil) is directed past the first and second end windings and then is collected in a basin for recirculation to the interior of the rotor shaft (e.g., after removing heat via a radiator or heat exchanger).

Figure 12:
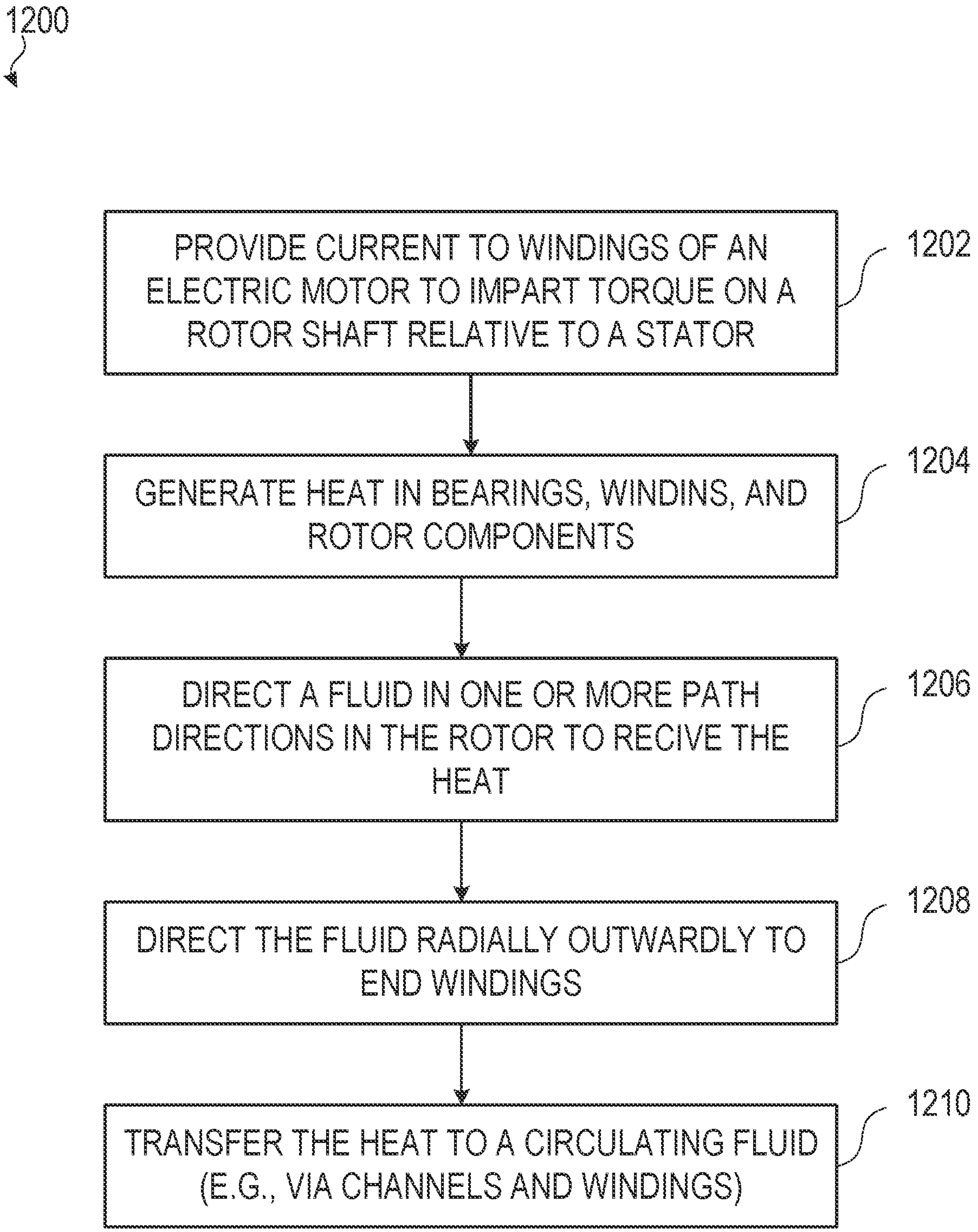
FIG. 12 illustrates a flow diagram of an example process for removing heat from components of a motor in accordance with one or more implementations of the subject technology.

FIG. 12 illustrates a flow diagram of an example process 1200 for removing heat from components of a motor in accordance with one or more implementations of the subject technology. For explanatory purposes, the process 1200 is primarily described herein with reference to components of the systems, motor, rotors, and/or assemblies of FIGS. 1-10. However, the process 1200 is not limited to the systems, motor, rotors, and/or assemblies of FIGS. 1-10, and one or more blocks (or operations) of the process 1200 may be performed by one or more other components of other suitable apparatuses, devices, or systems. In a further example, process 1200, or any blocks thereof, may be combined with any or all of the blocks of process 1100 of FIG. 11. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

Block 1202 includes providing current to windings of an electric motor to impart torque on a rotor shaft relative to a stator. In some embodiments, block 1202 includes generating control signals for power electronics to apply current to phases of the electric motor, to generate torque on a rotor and cause rotational motion of the rotor relative to a stator. For example, in some embodiments, the rotor may include permanent magnets and the stator may include phase windings, including end windings, and stator teeth.

Block 1204 includes generating heat in bearings, windings, magnets, and rotor components. For example, as the rotor rotates about an axis, heat may be generated in the rotor (e.g., due to losses), in bearings (e.g., due to friction), and in end windings (e.g., due to losses such as ohmic losses). In some embodiments, the amount of heat generated in the electric motor depends on the current profile applied at block 1202. For example, as greater currents, greater duration of current, or both are applied especially at higher rotational speed (e.g., higher excitation frequency), more heat may be generated in the electric motor and components thereof.

Block 1206 includes directing a fluid in one or more flow paths across the magnets in the rotor to receive the heat. In some embodiments, block 1206 includes directing the fluid in a first flow path and a second flow path, which can directly contact one or more magnets. In some embodiments, block 1206 includes providing a pressurized fluid to inlet passages of the rotor, thus causing the fluid to flow under pressure forces through the flow paths to respective outlet passages.

Block 1208 includes directing the fluid radially outward to end windings. In some embodiments, the fluid flows through the flow paths of block 1206 and then flows out of respective outlet passages at each axial end of the rotor. The fluid then flows radially outward, at block 1208, along end plates of the rotor to impinge on, or otherwise flow over, end windings arranged radially outward of the rotor. At block 1208, the fluid may flow under centrifugal forces, gravity forces, pressure forces, or a combination thereof. For example, in some embodiments, the fluid flows radially outward as the rotor rotates and sprays onto the end windings, thus cooling the windings via convective heat transfer through a boundary layer.

Block 1210 includes transferring the heat to the circulating fluid. The fluid receives heat via convection from the rotor (e.g., magnets) and end windings, and transports the heat (e.g., thermal energy stored in the fluid) away from the rotor. For example, the fluid may be directed to a radiator or other heat exchanger to reject the heat transferred at block 1210, and then be recirculated to the rotor for continued cooling.

In an illustrative example, an illustrative process (e.g., process 1100, process 1200, or a combination thereof) may include providing a coolant to a plurality of magnet channels extending axially through a rotor assembly and configured to provide cross flow of the coolant (e.g., at block 1102 and/or block 1206). The process may also include generating heat in the rotor assembly (e.g., at block 1204), and transferring the heat from the plurality of magnet channels to the coolant (e.g., at blocks 1206 and 1210, or during blocks 1104 and 1108, or a combination thereof).

In a further illustrative example, a plurality of magnet channels may include a first magnet channel and a second magnet channel. The first magnet channel may extend axially in a first direction to a first outlet passage, and the second magnet channel may extend axially in a second direction, opposite the first direction, to a second outlet passage. Providing the coolant to the plurality of magnet channels may include, for example, providing the coolant to a first magnet channel coupled to a first inlet passage, and providing the coolant to a second magnet channel coupled to a second inlet passage (e.g., at blocks 1104 and 1108, block 1206, or a combination thereof).

In a further illustrative example, the rotor assembly may include a first end plate arranged at a first axial position that includes a first outlet passage, and a second end plate arranged at a second axial position that includes a second outlet passage. An illustrative process (e.g., process 1100, process 1200, or a combination thereof) may include causing coolant to flow radially outward along the first end plate to first end windings (e.g., at block 1106 or block 1208), causing the coolant to flow radially outward along the second end plate to second end windings (e.g., at block 1110 or block 1208), and transferring heat from the first end windings and from the second end windings to the coolant.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A rotor assembly for a motor, the rotor assembly comprising:

a rotor shaft comprising a shaft channel; and a rotor core disposed about the rotor shaft and defining first magnet channels and second magnet channels each extending between opposing axial ends of the rotor core, each of the first magnet channels and the second magnet channels containing a magnet, wherein the rotor shaft defines:

first inlet passages originating from the shaft channel at a first end of the rotor core and extending radially through a first portion of a wall of the rotor shaft to provide fluid communication between the shaft channel of the rotor shaft and the first magnet channels of the rotor core, the first inlet passages defined in part by a first surface of the rotor core, and second inlet passages originating from the shaft channel at a second end of the rotor core and extending radially through a second portion of the wall to provide fluid communication between the shaft channel of the rotor shaft and the second magnet channels of the rotor core, the second inlet passages defined in part by a second surface, different from the first surface, of the rotor core;

a first end plate that defines first outlet passages extending radially and providing fluid communication between the first magnet channels and an exterior of the rotor core, wherein the first outlet passages comprise first grooves formed in the first end plate, wherein the first grooves face the rotor core; and a second end plate that defines second outlet passages extending radially and providing fluid communication between the second magnet channels and the exterior of the rotor core, wherein the second outlet passages comprise second grooves formed in the second end plate, wherein the second grooves face the rotor core.

2. The rotor assembly of claim 1, wherein the first inlet passages and the second inlet passages are circumferentially offset with respect to each other.

3. The rotor assembly of claim 1, wherein each of the first inlet passages and the second inlet passages extend transversely to a rotor axis extending through the shaft channel and about which the rotor assembly is configured to rotate.

4. The rotor assembly of claim 1, wherein each of the first inlet passages and the second inlet passages form a curved path.

5. The rotor assembly of claim 1, wherein:

the first magnet channels are arranged in pairs that are circumferentially adjacent to each other; and the second magnet channels are arranged in pairs that are circumferentially adjacent to each other.

6. The rotor assembly of claim 1, wherein the rotor core is formed of multiple layers arranged along a rotor axis, each of the multiple layers being circumferentially offset with respect to an adjacent other one of the multiple layers such that the first magnet channels and the second magnet channels wind about the rotor axis between the opposing axial ends of the rotor core.

7. A motor comprising:

a stator comprising stator coils configured to generate a rotating magnetic field; and a rotor comprising:

a rotor shaft comprising a shaft channel;

a rotor core disposed about the rotor shaft and defining magnet channels extending between opposing axial ends of the rotor core;

a first end plate that defines first outlet passages extending radially and providing fluid communication between the magnet channels and an exterior of the rotor core, wherein the first outlet passages comprise first grooves, formed in the first end plate, that face the rotor core; and a second end plate that defines second outlet passages extending radially and providing fluid communication between the magnet channels and the exterior of the rotor core, wherein the second outlet passages comprise second grooves, formed in the second end plate, that face the rotor core; and magnets arranged in each of the magnet channels of the rotor core, the magnets being responsive to the rotating magnetic field, wherein the rotor shaft defines inlet passages originating from the shaft channel and passing through different portions of a wall of the rotor shaft to provide a flow of a fluid from the shaft channel of the rotor shaft to the magnet channels of the rotor core as the rotor rotates, the different portions of the wall being axially offset from each other, wherein the rotor core further defines outlet passages, each of the outlet passages being positioned at a respective one of the axial ends of the rotor core that is axially opposite a position of a respective one of the inlet passages, and the inlet passages are defined in part by a first surface of the rotor core and by a second surface, opposite the first surface, of the rotor core.

8. The motor of claim 7, wherein the magnet channels provide a space on each of opposing sides of each of the magnets for the flow of the fluid.

9. The motor of claim 7, wherein the rotor core is formed of multiple layers arranged along a rotor axis, each of the multiple layers being circumferentially offset with respect to an adjacent other one of the multiple layers such that the magnet channels wind about the rotor axis between the opposing axial ends of the rotor core.

10. The motor of claim 7, wherein each of the inlet passages extending between a respective one of the axial ends of the rotor core and a respective one of the end plates.

11. The motor of claim 10, each of the outlet passages extending between a respective one of the axial ends of the rotor core and a respective one of the end plates.

12. The motor of claim 7, wherein the magnet channels comprise:

first magnet channels connected to the shaft channel at a first end of the rotor; and second magnet channels connected to the shaft channel at a second end of the rotor.

13. The motor of claim 7, further comprising a pump configured to receive the fluid from the magnet channels and direct the fluid to the shaft channel.

14. A method for cooling a rotor assembly of a motor, the method comprising:

providing the rotor assembly comprising a rotor shaft and a rotor core;

providing a fluid to a shaft channel of the rotor shaft; and directing the fluid to flow radially outwardly through different portions of a wall of the rotor shaft, the different portions originating from the shaft channel, through i) first magnet channels and second magnet channels of the rotor core, ii) first radial outlet passages defined by first grooves formed in a first end plate, the first radial outlet passages providing fluid communication between the first magnet channels and an exterior of the rotor core, and iii) second radial outlet passages defined by second grooves formed in a second plate, the second radial outlet passages providing fluid communication between the second magnet channels and the exterior of the rotor core, each of the magnet channels containing a magnet, wherein the different portions of the wall are axially offset from each other, the each of the first outlet passages and the second outlet passages is positioned axially opposite a respective one of the different portions, the fluid flows through two of the magnet channels in opposite directions, and each of the first radial outlet passages and the second radial outlet passages faces the rotor core.

15. The method of claim 14, wherein the fluid flows within the magnet channels across each magnet.

16. The method of claim 14, wherein providing the fluid to the shaft channel comprises operating a pump to receive the fluid from the rotor core and direct the fluid to the shaft channel.

17. The method of claim 14, wherein directing the fluid comprises:

directing the fluid from the shaft channel through a wall of the rotor shaft;

directing the fluid to the magnet channels via inlet passages formed between the rotor core and a respective one of multiple end plates of the rotor assembly;

directing the fluid across each magnet; and directing the fluid away from the magnet channels via outlet passages formed between the rotor core and a respective one of the multiple end plates of the rotor assembly.

18. The method of claim 14, wherein directing the fluid to flow comprises rotating the rotor assembly.

19. The method of claim 14, wherein directing the fluid to flow radially outward further comprises directing the fluid via inlet passages defined by exterior surfaces of the rotor core.

* * * * *